W. F. HOMRIGHAUSEN.
TOOL.
APPLICATION FILED JUNE 19, 1917.

1,266,683.

Patented May 21, 1918.

Witness
J. B. Gardner

INVENTOR
W. F. HOMRIGHAUSEN
By White & Prost
HIS ATTORNEYS

UNITED STATES PATENT OFFICE.

WILLIAM F. HOMRIGHAUSEN, OF SAN LEANDRO, CALIFORNIA, ASSIGNOR OF ONE-HALF TO A. S. WEAVER, OF SAN LEANDRO, CALIFORNIA.

TOOL.

1,266,683.

Specification of Letters Patent.   Patented May 21, 1918.

Application filed June 19, 1917.   Serial No. 175,588.

*To all whom it may concern:*

Be it known that I, WILLIAM F. HOMRIGHAUSEN, a citizen of the United States, and a resident of San Leandro, Alameda county, and State of California, have invented a certain new and useful Tool, of which the following is a specification.

The invention relates to tools and particularly to pliers of the sliding jaw type.

An object of the invention is to provide a tool which may be quickly adjusted to grip objects of different sizes, and which is designed to quickly grip or release the objects.

A further object of the invention is to provide a pair of pliers having a large range of adjustment and a large leverage, whereby a large force may be exerted by the jaws.

Another object of the invention is to provide a pair of pliers in which the movable jaw moves in a direction longitudinally of the handle.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one specific form of the tool of my invention, but it is to be understood that I do not limit myself to such form, since the invention, as expressed in the claims, may be embodied in a plurality of forms.

Referring to said drawings.

Figures 1, 2:
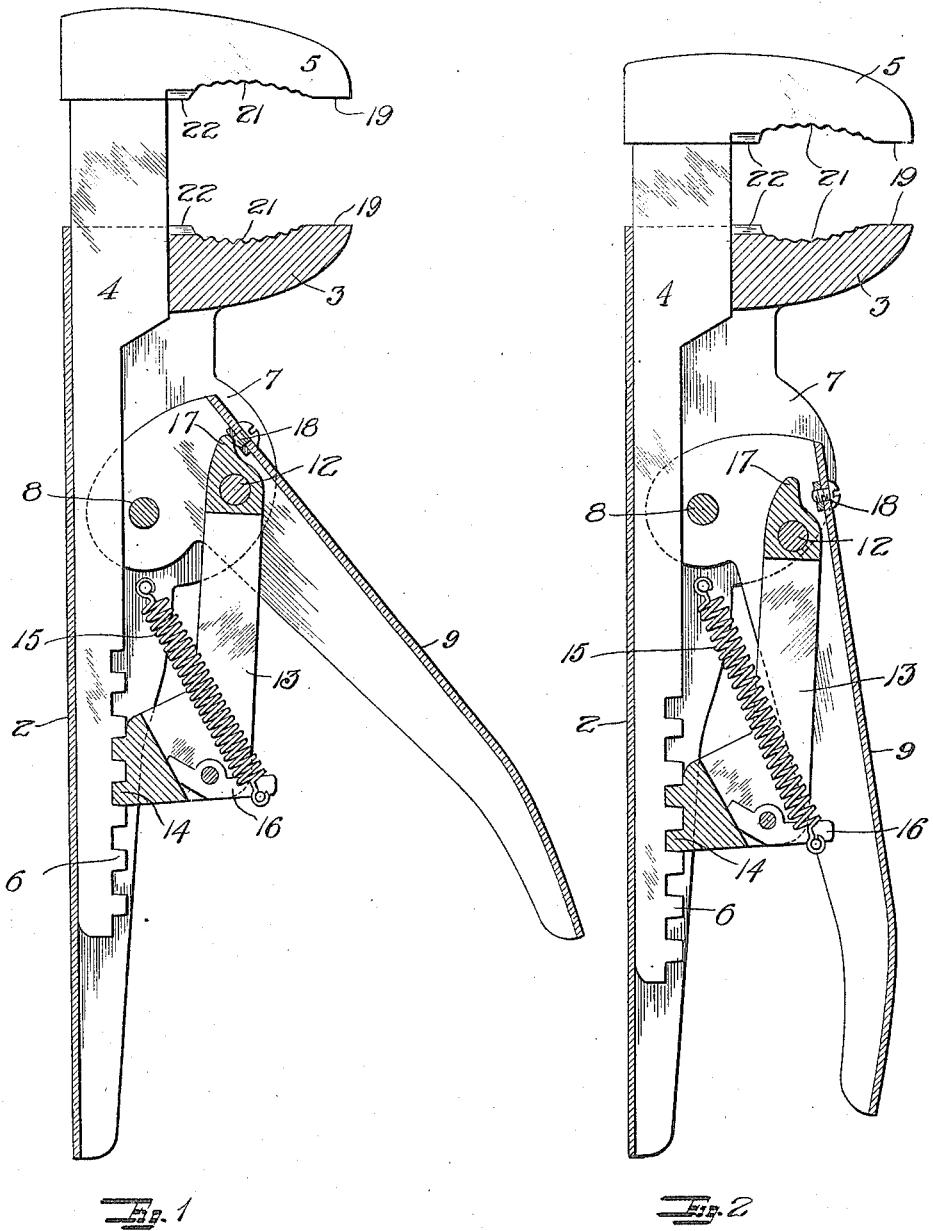
Figure 1 is a vertical section of the tool with the parts in extended position.
Fig. 2 is a similar view showing the parts in the contracted position.

The tool comprises a stationary hollow handle 2 formed of plate metal bent into U-shape, to the upper end of which is fixed the stationary jaw 3. Slidably disposed within the hollow handle 2 is the shank 4, the upper end of which is extended laterally to form the movable jaw 5. The jaws lie parallel to each other and preferably perpendicular to the handle 2 and the shank 4. The upper part of the shank 4 fits slidably in the aperture in the upper part of the handle formed between the body of the handle and the jaw 3, so that there is no lateral movement of the shank with respect to the handle. The lower part of the shank 4 is cut away and is provided with a series of teeth or serrations 6, along its inner edge. The handle 2 is broadened at its upper portion, forming a body which is composed of the two side plates 7. Pivoted on the pin 8, extending through the side plates 7, is a hollow lever or movable handle 9, formed of plate metal bent into U-shape and lying between the side plates 7 at its upper end. The handle 9 lies sufficiently close to the handle 2, so that both handles may be gripped by one hand.

Pivoted to the pin 12, arranged in the handle 9 adjacent the pivot 8 is a dog 13 which is provided at its lower end with a tooth or a plurality of teeth 14 adapted to engage the teeth 6 on the shank. The toothed end of the dog is normally held in contact with the toothed portion of the shank by the spring 15 attached at its upper end to the handle 2 and at its lower end to the dog 13. The spring is inclined from the vertical and its horizontal component tends to hold the teeth in mesh and its vertical component operates to draw the dog upward, thereby moving the handle 9 outward when the grip thereon is released. In order to obtain the desired inclination of the spring, a projection 16 is provided on the lower end of the dog and the spring is attached to the projection. The body portion of the dog is hollow and the spring extends through the body portion.

The pin 12 is movable in a vertical arc about the pin 8, so that as the handles are brought together, the shank is moved down in the handle 2, bringing the jaws closer together and into gripping contact with the object to be gripped. When it is desired to vary the setting of the jaws, the teeth 14 on the dog are moved out of engagement with the teeth on the shank, permitting the shank to be freely moved. This disengaging movement of the dog is produced by an outward movement of the handle 9 beyond its normal position. The upper end 17 of the dog is so shaped that it contacts with the rear wall of the handle 9 or with an abutment 18 thereon, when the handle is in normal position, so that a further outward movement of the handle 9 will move the dog out of engagement with the shank.

The adjacent faces of the jaws are provided with flat portions 19 at their outer ends and concave serrated faces 21 at their centers. Adjacent the shank 4, the jaws are provided with edged projections 22 which act as wire cutters. The tool is quickly adjustable and readily operated and on account of its large leverage, permits the object between the jaws to be gripped with great force.

I claim:

1. A tool of the class described, comprising a handle having a U-form section, a jaw secured to both sides of said handle and spaced from the bottom wall thereof to provide an aperture between the jaw and the walls of said handle, a notched shank slidably arranged within said handle and projecting through said aperture, a jaw on said shank coöperating with said first jaw, a grip lever of U-form section, the side walls thereof extending within the side walls of said handle and pivoted thereto, a dog pivoted to said grip lever at one end and adapted to engage the notches in said shank with the other end, whereby movement of said grip lever toward said handle moves said shank to close the jaws, and a coiled tension spring for retaining the dog in operative engagement with said notches and for moving said slidable shank to open said jaws.

2. A tool of the class described, comprising a handle, a jaw on said handle, a notched shank slidable in said handle, a jaw on said shank opposed to said first named jaw, a grip lever pivoted to said handle, a dog pivoted to said grip lever and adapted to engage in the notches on said shank whereby a closing movement of said grip lever toward said handle moves said shank to close said jaws, and a coiled tension spring for retaining the dog in operative engagement with said notches and coincidentally effecting an opening movement of said grip lever and a movement of said shank to separate said jaws.

In testimony whereof, I have hereunto set my hand at San Francisco, California, this 13th day of June, 1917.

WILLIAM F. HOMRIGHAUSEN.

In presence of—
H. G. Prost.

Copies of this patent may be obtained for five cents each, by addressing the "Commissioner of Patents, Washington, D. C."